United States Patent
Miyachi et al.

(10) Patent No.: US 11,336,789 B1
(45) Date of Patent: May 17, 2022

(54) CONTROLLING A MULTI-FUNCTION DEVICE BASED ON A USER LIMIT ASSOCIATED WITH A POLICY

(71) Applicant: Xerox Corporation, Norwalk, CT (US)

(72) Inventors: Christine Miyachi, Laconia, NH (US); Paul Roberts Conlon, South Bristol, NY (US); Lee C. Moore, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/131,432

(22) Filed: Dec. 22, 2020

(51) Int. Cl.
  *H04N 1/00* (2006.01)
  *G06N 3/04* (2006.01)
  *G06V 40/10* (2022.01)

(52) U.S. Cl.
  CPC .......... *H04N 1/00875* (2013.01); *G06N 3/04* (2013.01); *G06V 40/103* (2022.01); *H04N 1/00891* (2013.01); *H04N 1/00925* (2013.01)

(58) Field of Classification Search
  CPC .......... H04N 1/00875; H04N 1/00891; H04N 1/00925; G06K 9/00369; G06V 40/103
  See application file for complete search history.

(56) References Cited

U.S. PATENT DOCUMENTS

| | | | |
|---|---|---|---|
| 8,189,905 B2 | 5/2012 | Eaton et al. | |
| 2009/0102940 A1* | 4/2009 | Uchida | H04N 5/23218 348/222.1 |
| 2012/0260307 A1* | 10/2012 | Sambamurthy | G06F 21/554 726/1 |
| 2014/0253949 A1* | 9/2014 | Tsujimoto | H04N 1/0084 358/1.14 |
| 2016/0134843 A1* | 5/2016 | Torrione | G05B 19/042 348/159 |
| 2016/0330346 A1* | 11/2016 | Hayashi | H04N 1/00251 |
| 2017/0264766 A1* | 9/2017 | Okamoto | H04N 1/00336 |
| 2017/0264786 A1* | 9/2017 | Nishida | H04N 1/4426 |
| 2017/0269889 A1* | 9/2017 | Nobutani | H04N 1/00403 |
| 2018/0247132 A1* | 8/2018 | Liu | G06K 9/00362 |
| 2019/0260832 A1* | 8/2019 | Tokuchi | H04L 41/22 |
| 2020/0401793 A1* | 12/2020 | Leung | G06K 9/6211 |
| 2021/0112168 A1* | 4/2021 | Takatoh | H04N 1/00896 |
| 2021/0314727 A1* | 10/2021 | Bianchini | G08B 21/182 |

FOREIGN PATENT DOCUMENTS

WO 2017036370 A1 3/2017

* cited by examiner

*Primary Examiner* — Nicholas Pachol (57) ABSTRACT

A method is disclosed. For example, the method executed by a processor of a multi-function device (MFD) includes receiving a video image of a multi-function device (MFD), applying an object detection model to the video image to generate an annotated image with bounding boxes around persons detected in the video image, determining a number of the bounding boxes, determining that the number of bounding boxes is greater than a threshold in a policy associated with the MFD, and deactivating the MFD.

18 Claims, 5 Drawing Sheets

CONTROLLING A MULTI-FUNCTION DEVICE BASED ON A USER LIMIT ASSOCIATED WITH A POLICY

The present disclosure relates generally to multi-function devices (MFDs), and relates more particularly to policy enforcement at an MFD.

BACKGROUND

Multi-function devices (MFDs) are used to process print jobs. An MFD can perform a variety of different functions including printing, scanning, copying, faxing, and the like.

An enterprise or a company may have various policies related to use of different equipment including MFDs. The policies may be instituted for a variety of different reasons. For example, the policies may be instituted for health reasons, for cost savings, for production efficiency, and the like.

SUMMARY

According to aspects illustrated herein, there are provided a method and a non-transitory computer readable medium for controlling an MFD based on user limit associated with a policy. One disclosed feature of the embodiments is a method, executed by a processor of the MFD, that comprises receiving a video image of a multi-function device (MFD), applying an object detection model to the video image to generate an annotated image with bounding boxes around persons detected in the video image, determining a number of the bounding boxes, determining that the number of bounding boxes is greater than a threshold in a policy associated with the MFD, and deactivating the MFD.

Another disclosed feature of the embodiments is a non-transitory computer-readable medium having stored thereon a plurality of instructions, the plurality of instructions including instructions which, when executed by a processor, cause the processor to perform operations to receive a video image of a multi-function device (MFD), apply an object detection model to the video image to generate an annotated image with bounding boxes around persons detected in the video image, determine a number of the bounding boxes, determine that the number of bounding boxes is greater than a threshold in a policy associated with the MFD, and deactivate the MFD.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and apparatus to control an MFD based on a user limit associated with a policy. As discussed above, an enterprise or a company may have various policies related to use of different equipment including MFDs. The policies may be instituted for a variety of different reasons. For example, the policies may be instituted for health reasons, for cost savings, for production efficiency, and the like.

An example of a health policy may be to limit a number of people at the MFD. For example, for health reasons, some policies may want users to keep away from one another to prevent spread of a viral disease. Thus, a policy may be implemented at the MFD to control operation of the MFD based on a number of people at the MFD. For example, the MFD may be deactivated when a number of people greater than a threshold is detected at the MFD. The policy may also generate alarms and notifications to administrators to clean the MFD in between uses and reactivate the MFD.

One embodiment of the present disclosure uses continuous video monitoring and analysis to detect a number of people at the MFD. An application layer of the MFD may be modified to include instructions that deactivate the MFD when the video image analysis detects more than one person within a field of view of the video camera. Once the number of people are within the threshold associated with the policy, the MFD may be reactivated for use.

In one embodiment, artificial intelligence loaded onto an edge device may be used to perform the video analysis. A counting server may also be deployed to count the number of bounding boxes identified by the edge device. As a result, the computationally intensive video analysis may be off-loaded from the processor of the MFD and prevent interference with processing of print jobs, scan jobs, copy jobs, and the like.

Figure 1:
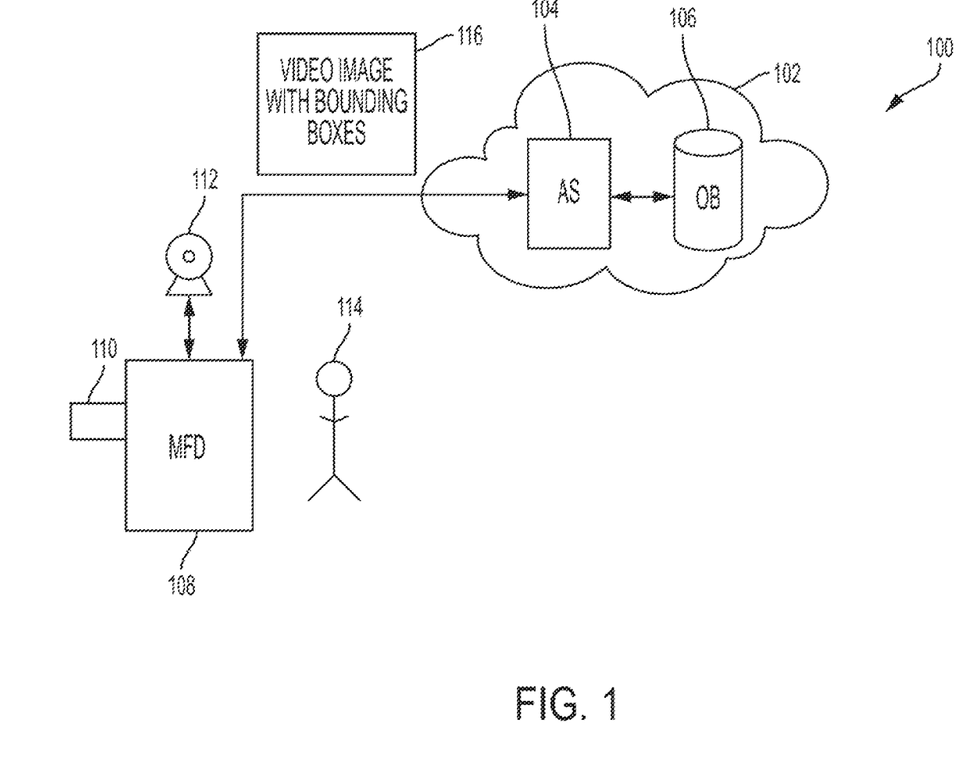
FIG. 1 illustrates a block diagram of an example network with an MFD of the present disclosure.

FIG. 1 illustrates an example network 100 of the present disclosure. In one embodiment, the network 100 may include an internet protocol (IP) network 102 in communication with an MFD 108. Although a single MFD 108 is illustrated in FIG. 1, it should be noted that any number of MFDs 108 may be deployed. In addition, when multiple MFDs 108 are deployed, the MFDs 108 may be located within a single location or building or distributed across different geographic locations and/or office buildings. The MFD 108 may be any type of device that can perform print functions, copying functions, scanning functions, faxing functions, scan and email functions, and the like.

In one embodiment, the IP network 102 may include an application server (AS) 104 and a database (DB) 106. Although a single AS 104 and single DB 106 are illustrated in FIG. 1, it should be noted that any number of application servers and databases may be deployed in the IP network 102. The AS 104 and the DB 106 may be operated by a service provider that manages the operation and maintenance of the MFDs 108 deployed at different locations and/or different customer sites.

It should be noted that the IP network 102 has been simplified for ease of explanation. For example, the IP network 102 may include additional network components that are not shown. For example, the IP network 102 may include additional access networks, a gateway, a firewall, various network elements, and the like.

In one embodiment, the AS 104 may be a counting server that may be used to count a number of persons based on analysis of a video image with bounding boxes 116 that is received from the MFD 108. The AS 104 may also be a web server that may host a website. The website may allow a user to view the video image with bounding boxes 116.

In one embodiment, the DB 106 may be a storage server that stores various information associated with the MFD 108, various user profiles, instructions associated with hosting a web page, and the like. The AS 104 may be communicatively coupled to the DB 106 to retrieve information from the DB 106 and/or to execute instructions stored in the DB 106. Although the AS 104 and the DB 106 are shown as separate devices, the AS 104 and the DB 106 may be deployed as a single device.

In one embodiment, the network 100 may also include an edge device 110 and a video camera 112. The edge device 110 and the video camera 112 may be communicatively coupled to the MFD 108. The edge device 110 may apply an object detection model that is trained to identify portions of frames of a video image that may look like a person. The object detection model may then draw bounding boxes around the objects that look like a person to generate an annotated image with bounding boxes 116. The annotated image with bounding boxes 116 may then be transmitted to the AS 104 to count the number of bounding boxes 116.

In one embodiment, the video camera 112 may be any type of device that can continuously capture video images. The video camera 112 may be a red, green, blue (RGB) video camera, a black and white camera, an infrared camera, and the like.

In one embodiment, the video camera 112 may have a motion detector to activate when motion is detected to save power and processing resources. For example, when a person or persons move in front of the video camera 112, the video camera 112 may begin recording to capture video images. When the person leaves and no motion is detected for a predetermined amount of time, the video camera 112 may be deactivated to stop recording video images.

The video camera 112 may be located by the MFD 108 to continuously capture video images of the MFD 108. In one embodiment, the video camera 112 may be set at a distance such that a field of view of the video camera 112 is approximately equal to a desired distance.

For example, certain health policies may suggest that people be distanced six feet apart. Thus, the video camera 112 may be set at a distance that captures a field of view that is approximately equal to six feet of width and includes the MFD 108.

In one embodiment, the MFD 108 may be associated with a policy that indicates that the MFD 108 should be deactivated if more than one person is detected around the MFD 108. Thus, the video images captured by the video camera 112 may be analyzed by the edge device 110 to draw bounding boxes. The annotated image with bounding boxes 116 may be transmitted to the AS 104 to have the number of bounding boxes counted. The number of bounding boxes may be equivalent to a number of people detected within the field of view of the video camera 112. The number of bounding boxes may be transmitted back to the MFD 108. If the number of bounding boxes is greater than one, then the MFD 108 may determine that there are two or more people that are closer than six feet (e.g., since the video camera 112 is set to a distance that captures a field of view of approximately six feet wide). In response, the MFD 108 may execute an action, as discussed in further details below (e.g., deactivate, generate a warning, generate a notification that is transmitted, and the like). Thus, FIG. 1 illustrates an example of how the MFD 108 may be controlled based on a user limit associated with a policy of the MFD 108.

FIG. 1 illustrates an example of video images being analyzed by the edge device 110 and the AS 104. The use of the edge device 110 and the AS 104 may prevent processing capabilities of the MFD 108 from being overwhelmed from continuous video analysis. Video analysis can be computationally intensive. Thus, the edge device 110 and the AS 104 may allow the processing resources of the MFD 108 to be dedicated to executing various job functions (e.g., print jobs, scan jobs, copy jobs, and the like). However, it should be noted that as processing capabilities of the MFD 108 are improved, the video analysis may be performed locally by the MFD 108 without using the edge device 110 and the AS 104.

Figure 2:
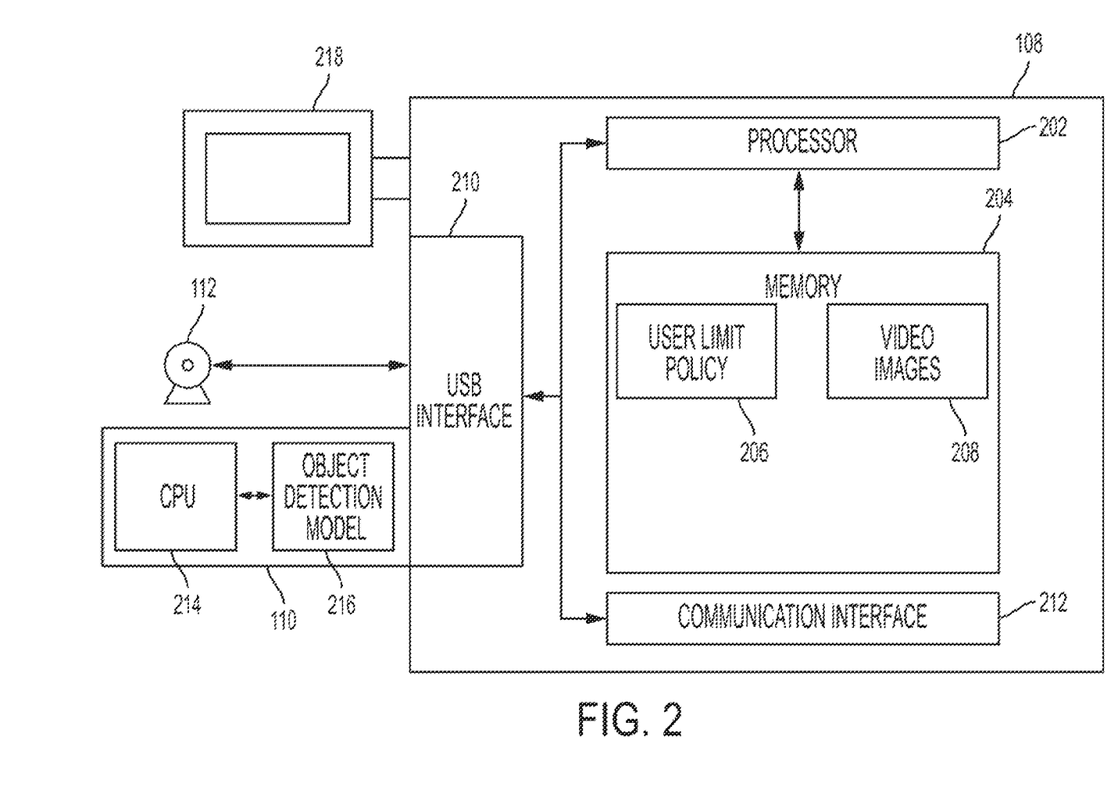
FIG. 2 illustrates a block diagram of an example MFD of the present disclosure.

FIG. 2 illustrates a block diagram of an example MFD 108 of the present disclosure. In one embodiment, the MFD 108 may include a processor 202, a memory 204, a communication interface 212, a universal serial bus (USB) interface 210, and a display 218. It should be noted that the MFD 108 has been simplified for ease of explanation and may include additional components that are not shown. For example, the MFD 108 may include an optical scanner, a print path, a printhead, a paper tray, various finishing modules, an output tray, and the like.

In one embodiment, the processor 202 may be communicatively coupled to the memory 204, the communication interface 212, the USB interface 210, and the display 218. The processor 202 may execute instructions stored in the memory 204 to perform the functions described herein.

In one embodiment, the memory 204 may be a non-transitory computer readable medium, such as a random access memory (RAM), a read only memory (ROM), a solid state drive, a hard disk drive, and the like. In one embodiment, the memory 204 may store a user limit policy 206 and video images 208. In one embodiment, the user limit policy 206 may include a threshold for a number of persons or users that may be allowed at the MFD 108. For example, the threshold may be one person, three people, and the like.

In one embodiment, the video images 208 may be temporarily stored to be analyzed by the edge device 110. The video images 208 may be deleted after being analyzed to preserve the privacy of people who may be using the MFD 108. For example, in some instances the users may be recorded at the MFD with or without their consent. As a result, the images may be used to analyze a number of people without identifying who the users are in the video image to prevent violation of any privacy rules and/or laws. In one embodiment, the portion of the memory 204 that temporarily stores the video images 208 may be a circular buffer that does not permanently store the video images 208. For example, the video images 208 are not stored on a hard disk drive or in the cloud.

In one embodiment the memory 204 may also store an application or instructions that are executed by the processor 202 to perform the functions that are described herein. For example, the MFD 108 may be modified at the application layer to include an application that controls operation of the MFD 108 based on the number of users that are detected by the MFD 108 in the video images that are captured by the video camera 112. An example application layer protocol may include an extensible interface protocol (EIP) or other proprietary application layer protocols.

In one embodiment, the communication interface 212 may be a wired or wireless communication interface. The communication interface 214 may be a WiFi radio, an Ethernet connection interface, and the like. The communication interface 214 may establish a communication path with the AS 104 to exchange the video image or annotated image with bounding boxes 116, other types of data, notifications, and the like. As noted above, in one embodiment, the AS 104 may also transmit back to the MFD 108 the number of bounding boxes that are counted via the communication interface 212.

In one embodiment, the display 218 may be a graphical user interface (GUI). In one embodiment, the display 218 may be a touch screen interface that allows users to make selections by touching the display 218. In one embodiment, the display 218 may have a keyboard or physical buttons that allow a user to make selections shown on the display 218.

In one embodiment, the USB interface 210 may provide interfaces to electrically connect various devices such as the edge device 110 and the video camera 112. Although a single edge device 110 is illustrated in FIGS. 1 and 2, it should be noted that any number of edge devices 110 may be connected to the USB interface 210 of the MFD 108.

In one embodiment, the edge device 110 may include a central processing unit (CPU) 214 and an object detection model 216. The object detection model 216 may be applied to the video images 208 that are temporarily stored in the memory 204 and captured by the video camera 112. The object detection model 216 may be trained to analyze frames of the video images, detect a desired object (e.g., a person in the present disclosure) with the frames of video, and draw bounding boxes around the detected objects within a frame of video. An example of the object detection model 216 may be the OpenVINO Toolkit for person detection.

In one embodiment, the edge device 110 may be a neural network stick. The neural network stick may be a USB stick that has artificial intelligence that can include neural networks to perform deep learning and/or be trained to perform various functions (e.g., apply the pre-trained object detection model 216). For example, the CPU 214 in the neural network stick may be a vision processing unit (VPU) that can offload much of the video analysis processing from the MFD 108.

Figure 3:
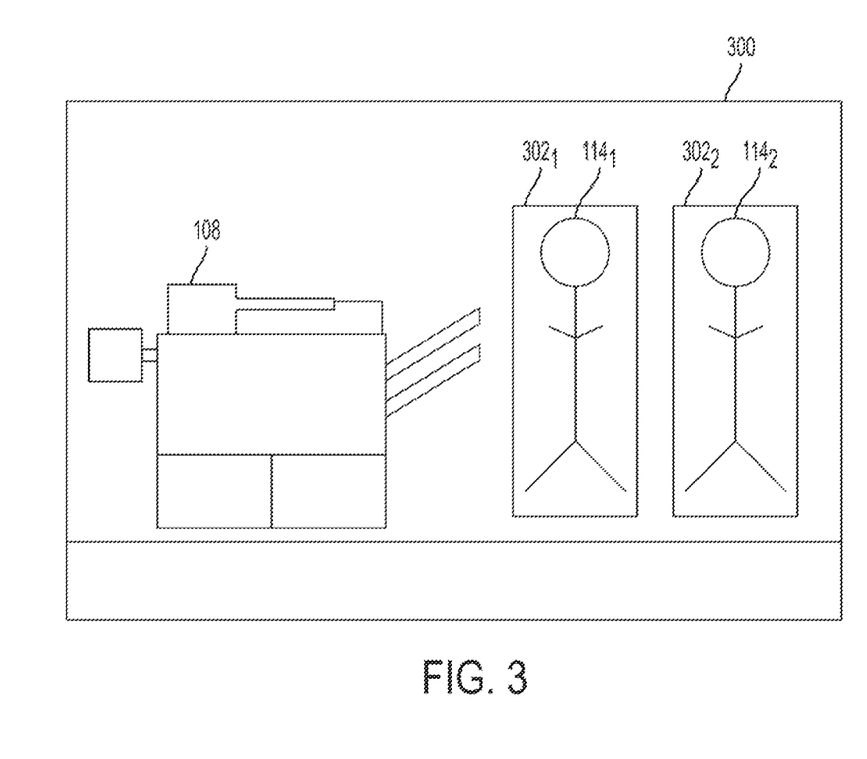
FIG. 3 illustrates an example analysis of a video image to detect a number of people at the MFD of the present disclosure.

As noted above, the edge device 110 may analyze video images captured by the video camera 112. FIG. 3 illustrates an example image 300 that is analyzed to detect a number of people at the MFD 108. In one embodiment, the image 300 may be a single frame of video within a sequence of frames of the video image captured by the video camera 112.

As noted above, the field of view of the image 300 may be approximately equivalent to a desired distance associated with the user limit policy 206. For example, the user limit policy 206 may set a threshold of one person within a 6 foot distance around the MFD 108.

In one embodiment, the object detection model 216 may be applied to the image 300 to detect people. The object detect model 216 may be executed by the edge device 110 to detect people $114_1$ and $114_2$. Respective bounding boxes $302_1$ and $302_2$ may be drawn around the detected people $114_1$ and $114_2$. After the bounding boxes $302_1$ and $302_2$ are drawn, the image may be saved as an annotated image. The annotated image may be the video image with bounding boxes 116 that is transmitted to the AS 104.

In one embodiment, the image 300 with the bounding boxes $302_1$ and $302_2$ may also be shown in a webpage hosted by the AS 104. The AS 104 may count the number of bounding boxes $302_1$ and $302_2$. In one embodiment, an analyst viewing the web page hosted by the AS 104 and viewing the image with bounding boxes 116 on the web page may count the number of bounding boxes $302_1$ and $302_2$. In the present example, the number of bounding boxes $302_1$ and $302_2$ is two.

The AS 104 may transmit the number of bounding boxes that are detected back to the MFD 108. The MFD 108 may then compare the number to the threshold associated with the user limit policy 206. Using the example above, the threshold may be set to one person in the user limit policy 206. The number of bounding boxes that is detected may be compared to the threshold to determine that the number of bounding boxes is greater than the threshold. As a result, the MFD 108 may execute an action to enforce the user limit policy 206.

In one embodiment, the processor 202 of the MFD 108 may deactivate the MFD 108. In addition, the processor 202 may generate a notification that may be shown on the display 218. The notification may indicate that more than one person was detected at the MFD 108 and notify the users that the MFD 108 cannot be reactivated until only a single person is detected at the MFD 108.

In one embodiment, the MFD 108 may generate a message (e.g., a text message, an email, and the like) that may be transmitted to an endpoint device of an administrator (e.g., a smart phone, a laptop computer, a tablet computer, a desktop computer, and the like). The message may include a date and time of when the user limit policy 206 is violated, an identification of the MFD 108, a location of the MFD 108, and the like. Thus, the administrator may re-educate employees on the user limit policy 206, determine if additional MFDs 108 should be deployed to help maintain the user limit policy 206, and the like.

In one embodiment, the administrator may confirm that people leave the MFD 108 until a single user is at the MFD 108 and then provide an authorization signal back to the MFD 108. The administrator may also confirm that the MFD has been cleaned. The MFD 108 may then reactivate when a single person is detected based on continuous analysis of the video images captured by the video camera 112 or when the authorization signal is received from the administrator.

Figure 4:
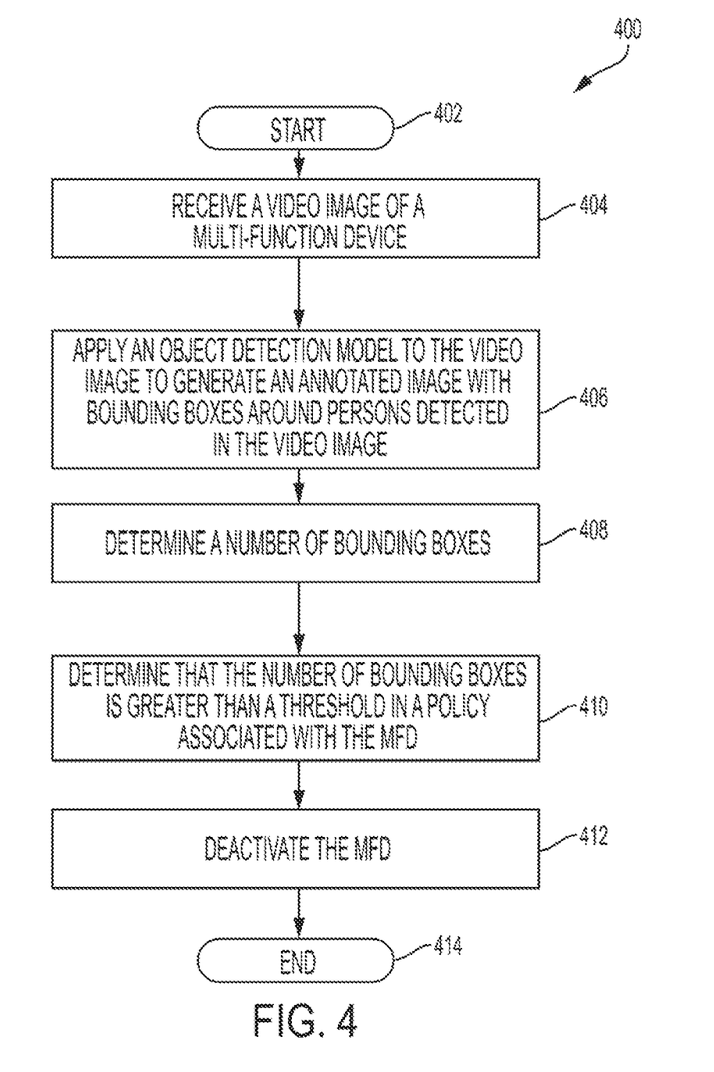
FIG. 4 illustrates a flow chart of a method for controlling an MFD based on user limit associated with a policy of the present disclosure.

FIG. 4 illustrates a flow chart of an example method 400 for controlling an MFD based on user limit associated with a policy of the present disclosure. In one embodiment, the method 400 may be performed by the MFD 102 or by an apparatus, such as the apparatus 500 illustrated in FIG. 5 and discussed below.

In one embodiment, the method 400 begins at block 402. At block 404, the method 400 receives a video image of an MFD. For example, a video camera may be located near the MFD to capture video images of the MFD. In one embodiment, the video camera may be placed a distance that is a function of a desired distance to be captured by the field of view of the camera. The desired distance may be a function of a distance of a health policy. For example, some health policies may indicate that people should stay six feet apart. Thus, the video camera may be placed at a distance that allows a six foot width to be captured within the field of view of the camera.

At block 406, the method 400 applies an object detection model to the video image to generate an annotated image with bounding boxes around persons detected in the video image. For example, each frame of the video image may be analyzed. A frame of the video image may be used to generate the annotated image with bounding boxes. In one embodiment, the object detection model may be applied by the MFD.

In one embodiment, to offload the processing from the MFD, an edge device may be used to apply the object detection model. In one embodiment, the edge device may be a neural network stick that is connected to the MFD via a USB connection.

At block 408, the method 400 determines a number of the bounding boxes. In one embodiment, the MFD may count the number of bounding boxes locally.

In one embodiment, an annotated image that includes the drawn bounding boxes may be transmitted to a counting server to offload the processing from the MFD. The counting server may count the number of bounding boxes in the annotated image. In one embodiment, the counting server may also be a server that hosts a webpage that displays the annotated image to an analyst who may be monitoring the MFD. The number of bounding boxes that is counted may be transmitted back to the MFD and received by the MFD.

At block 410, the method 400 determines that the number of bounding boxes is greater than a threshold in a policy associated with the MFD. In one embodiment, the number of bounding boxes may be equal to a number of people that is detected in the video image. The number of bounding boxes may be compared to the threshold to determine if the policy associated with the MFD is violated. When the policy is violated the MFD may execute one or more actions in response to the violation of the policy.

At block 412, the method 400 deactivates the MFD. In one embodiment, one of the actions may be to deactivate the MFD. The MFD may be deactivated until a single person is detected at the MFD. For example, the blocks 404 to 410 may be repeated continuously until the number of bounding boxes is less than or equal to the threshold to reactivate the MFD. To illustrate, additional video images may be captured and analyzed. The object detection model may be applied to the subsequently received video images to generate a second annotated image with bounding boxes around persons that are detected in the video image. A number of the bounding boxes in the second annotated image may be determined and compared to the threshold. If the number of bounding boxes is less than the threshold, the MFD may be activated.

In one embodiment, a notification may be shown on a display of the MFD explaining why the MFD is deactivated or refusing to execute a job request. For example, the notification may explain that the number of users at the MFD violates the policy associated with the MFD.

In one embodiment, the action may include generating and transmitting a message or notification to an endpoint device of an administrator. The administrator may confirm that the additional people near the MFD have left and a single user remains at the MFD. In one embodiment, the administrator may confirm that the MFD has been cleaned before the MFD is used again. The administrator may then transmit an authorization signal when a single person remains at the MFD and/or the MFD was cleaned. The MFD may receive the authorization signal and reactivate in response to the authorization signal.

In one embodiment, the video images may be deleted after each cycle of the method 400 is performed. In other words, the video images may be deleted after being analyzed. The video images may be deleted to preserve privacy of users at the MFD. In one embodiment, each frame of the video image may be deleted after being analyzed. For example, the frame captured by the video camera and the annotated images may be deleted frame after frame during the analysis process. At block 414, the method 400 ends.

Figure 5:
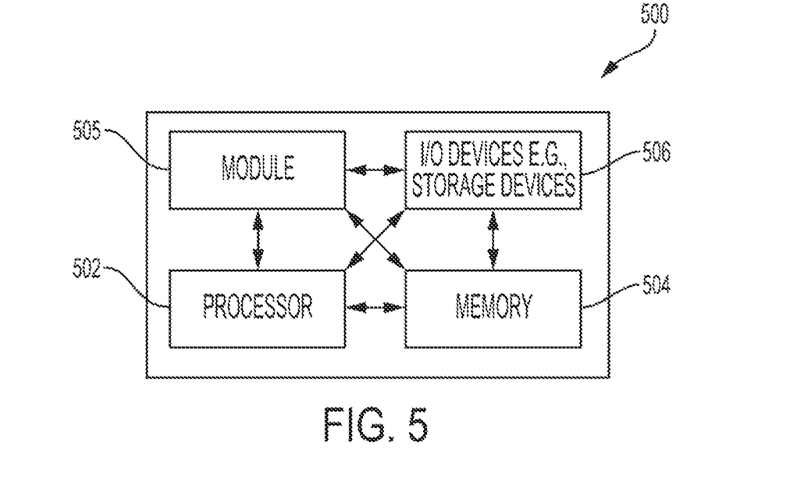
FIG. 5 illustrates a high-level block diagram of an example computer suitable for use in performing the functions described herein.

FIG. 5 depicts a high-level block diagram of a computer that is dedicated to perform the functions described herein. As depicted in FIG. 5, the computer 500 comprises one or more hardware processor elements 502 (e.g., a central processing unit (CPU), a microprocessor, or a multi-core processor), a memory 504, e.g., random access memory (RAM) and/or read only memory (ROM), a module 505 for a method for controlling an MFD based on user limit associated with a policy, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 505 for a method for controlling an MFD based on user limit associated with a policy (e.g., a software program comprising computer-executable instructions) can be loaded into memory 504 and executed by hardware processor element 502 to implement the steps, functions or operations as discussed above. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for a method for controlling an MFD based on user limit associated with a policy (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method, comprising:
  receiving, by a processor, a video image of a multifunction device (MFD), wherein the video image is captured by a video camera in communication with the MFD, wherein a field of view of the video camera contains the MFD and a desired amount of space around the MFD in accordance with a policy;

applying, by the processor, an object detection model to the video image to generate an annotated image with bounding boxes around persons detected in the video image;

determining, by the processor, a number of the bounding boxes;

determining, by the processor, that the number of bounding boxes is greater than a threshold in the policy associated with the MFD; and deactivating, by the processor, the MFD.

2. The method of claim 1, further comprising:

applying, by the processor, the object detection model to a subsequently received video image to generate a second annotated image with bounding boxes around persons detected in the subsequently received video image;

determining, by the processor, a number of the bounding boxes in the second annotated image;

determining, by the processor, that the number of bounding boxes in the second annotated image is less than the threshold; and activating, by the processor, the MFD.

3. The method of claim 1, further comprising:

receiving, by the processor, a confirmation that the MFD has been cleaned and that a number of users at the MFD is less than the threshold; and activating, by the processor, the MFD.

4. The method of claim 1, further comprising:

generating, by the processor, a notification that a number of users at the MFD violates the policy.

5. The method of claim 1, wherein the object detection model is stored on and executed by an edge device communicatively coupled to the MFD.

6. The method of claim 5, wherein the edge device comprises a neural network stick.

7. The method of claim 1, wherein the determining comprises:

transmitting, by the processor, the annotated image to a counting server; and receiving, by the processor, the number of bounding boxes from the counting server.

8. The method of claim 7, wherein the counting server is to host a web page that shows the annotated image.

9. The method of claim 1, further comprising:

deleting, by the processor, the video image and the annotated image after each cycle of the applying the object detection model and the determining the number of bounding boxes.

10. A non-transitory computer-readable medium storing a plurality of instructions, which when executed by a processor of a multi-function device (MFD), causes the processor to perform operations, comprising:

receiving a video image of a multi-function device (MFD), wherein the video image is captured by a video camera in communication with the MFD, wherein a field of view of the video camera contains the MFD and a desired amount of space around the MFD in accordance with a policy;

applying an object detection model to the video image to generate an annotated image with bounding boxes around persons detected in the video image;

determining a number of the bounding boxes;

determining that the number of bounding boxes is greater than a threshold in the policy associated with the MFD; and deactivating the MFD.

11. The non-transitory computer-readable medium of claim 10, further comprising:

applying the object detection model to a subsequently received video image to generate a second annotated image with bounding boxes around persons detected in the subsequently received video image;

determining a number of the bounding boxes in the second annotated image;

determining that the number of bounding boxes in the second annotated image is less than the threshold; and activating the MFD.

12. The non-transitory computer-readable medium of claim 10, further comprising:

receiving a confirmation that the MFD has been cleaned and that a number of users at the MFD is less than the threshold; and activating the MFD.

13. The non-transitory computer-readable medium of claim 10, further comprising:

generating, by the processor, a notification that a number of users at the MFD violates the policy.

14. The non-transitory computer-readable medium of claim 10, wherein the object detection model is stored on and executed by an edge device communicatively coupled to the MFD.

15. The non-transitory computer-readable medium of claim 10, wherein the determining comprises:

transmitting the annotated image to a counting server; and receiving the number of bounding boxes from the counting server.

16. The non-transitory computer-readable medium of claim 15, wherein the counting server is to host a web page that shows the annotated image.

17. The non-transitory computer-readable medium of claim 10, further comprising:

deleting, by the processor, the video image and the annotated image after each cycle of the applying the object detection model and the determining the number of bounding boxes.

18. A method, comprising:

receiving, by a processor, a video image of a multi-function device (MFD) and persons at the MFD, wherein the video image is captured by a video camera in communication with the MFD, wherein a field of view of the video camera contains the MFD and a desired amount of space around the MFD in accordance with a policy;

applying, by the processor, an object detection model to the video image to generate an annotated image with bounding boxes around persons detected in the video image, wherein the object detection model is executed by a neural network stick connected to the MFD;

transmitting, by the processor, the annotated image to a counting server;

receiving, by the processor, a number of bounding boxes in the annotated image;

comparing, by the processor, a number of the bounding boxes to a threshold in the policy associated with the MFD;

executing, by the processor, a job when the number of bounding boxes is less than the threshold in the policy; and deactivating, by the processor, the MFD when the number of bounding boxes is greater than the threshold in the policy.

* * * * *